US009126563B2

(12) United States Patent
Piccard

(10) Patent No.: US 9,126,563 B2
(45) Date of Patent: Sep. 8, 2015

(54) AIRBAG MODULE

(71) Applicant: TK Holdings Inc., Auburn Hills, MI (US)

(72) Inventor: Robert Lee Piccard, Auburn Hills, MI (US)

(73) Assignee: TK HOLDINGS INC, Auburn Hills, MI (US)

( * ) Notice: Subject to any disclaimer, the term of this patent is extended or adjusted under 35 U.S.C. 154(b) by 0 days.

(21) Appl. No.: 14/213,201

(22) Filed: Mar. 14, 2014

(65) Prior Publication Data

US 2014/0265274 A1   Sep. 18, 2014

Related U.S. Application Data

(60) Provisional application No. 61/793,178, filed on Mar. 15, 2013.

(51) Int. Cl.
  *B60R 21/203*   (2006.01)
  *B60R 21/239*   (2006.01)

(52) U.S. Cl.
  CPC ............. *B60R 21/239* (2013.01); *B60R 21/203* (2013.01)

(58) Field of Classification Search
  CPC ............................ B60R 21/239; B60R 21/203
  USPC .................................................. 280/731, 739
  See application file for complete search history.

(56) References Cited

U.S. PATENT DOCUMENTS

| | | | | |
|---|---|---|---|---|
| 6,131,942 A * | 10/2000 | Fujii et al. | ................ | 280/728.2 |
| 6,554,313 B2 * | 4/2003 | Uchida | ................ | 280/729 |
| 6,773,030 B2 * | 8/2004 | Fischer | ................ | 280/739 |
| 7,240,918 B2 * | 7/2007 | Yamada et al. | ................ | 280/739 |
| 7,475,906 B2 * | 1/2009 | Goto et al. | ................ | 280/743.2 |
| 7,635,148 B2 * | 12/2009 | Sager | ................ | 280/739 |
| 7,726,685 B2 * | 6/2010 | Abe et al. | ................ | 280/736 |
| 7,850,200 B2 * | 12/2010 | Zauritz et al. | ................ | 280/740 |
| 8,491,004 B2 * | 7/2013 | Mendez et al. | ................ | 280/739 |
| 2003/0020266 A1 * | 1/2003 | Vendely et al. | ................ | 280/739 |
| 2005/0225065 A1 * | 10/2005 | Fujll | ................ | 280/743.2 |
| 2006/0151976 A1 * | 7/2006 | Abe | ................ | 280/729 |
| 2007/0045997 A1 * | 3/2007 | Abe et al. | ................ | 280/729 |
| 2007/0052222 A1 * | 3/2007 | Higuchi et al. | ................ | 280/738 |
| 2007/0187932 A1 * | 8/2007 | Sekizuka | ................ | 280/730.1 |
| 2008/0073891 A1 * | 3/2008 | Rose et al. | ................ | 280/739 |
| 2010/0225095 A1 * | 9/2010 | Smith et al. | ................ | 280/729 |
| 2011/0101652 A1 * | 5/2011 | Abe | ................ | 280/728.3 |
| 2011/0115202 A1 * | 5/2011 | Hiruta et al. | ................ | 280/741 |
| 2012/0292896 A1 * | 11/2012 | Higuchi | ................ | 280/731 |
| 2013/0334801 A1 * | 12/2013 | Williams | ................ | 280/739 |
| 2014/0062071 A1 * | 3/2014 | Ishiguro et al. | ................ | 280/739 |
| 2014/0265274 A1 * | 9/2014 | Piccard | ................ | 280/731 |
| 2014/0306434 A1 * | 10/2014 | Jang | ................ | 280/739 |

* cited by examiner

*Primary Examiner* — Karen Beck
(74) *Attorney, Agent, or Firm* — Foley & Lardner LLP

(57) ABSTRACT

An airbag module including an airbag configured to inflate between a steering wheel and a vehicle occupant and an inflator configured to provide inflation gas to the airbag. The airbag includes a first vent opening and a second vent opening, and the first and second vent openings are configured to allow venting of an inflation gas. The first vent opening and second vent opening are arranged such that the first vent opening is located above a rim of the steering wheel and the second vent opening is located below the rim of the steering wheel when the airbag is in an inflated state.

20 Claims, 7 Drawing Sheets

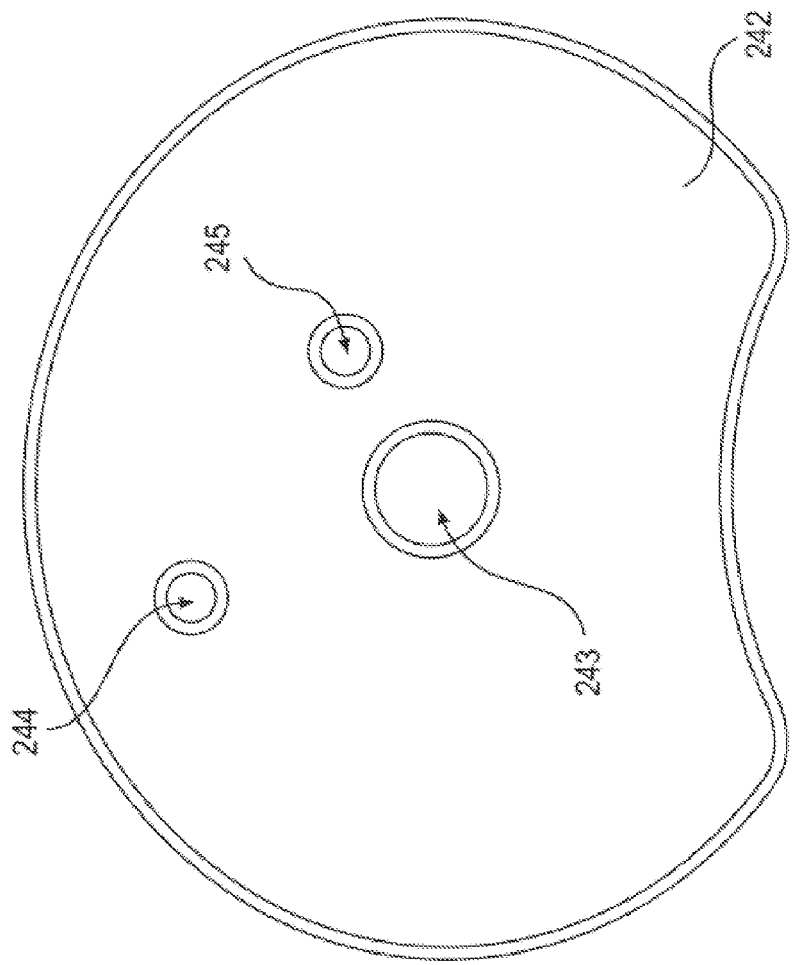

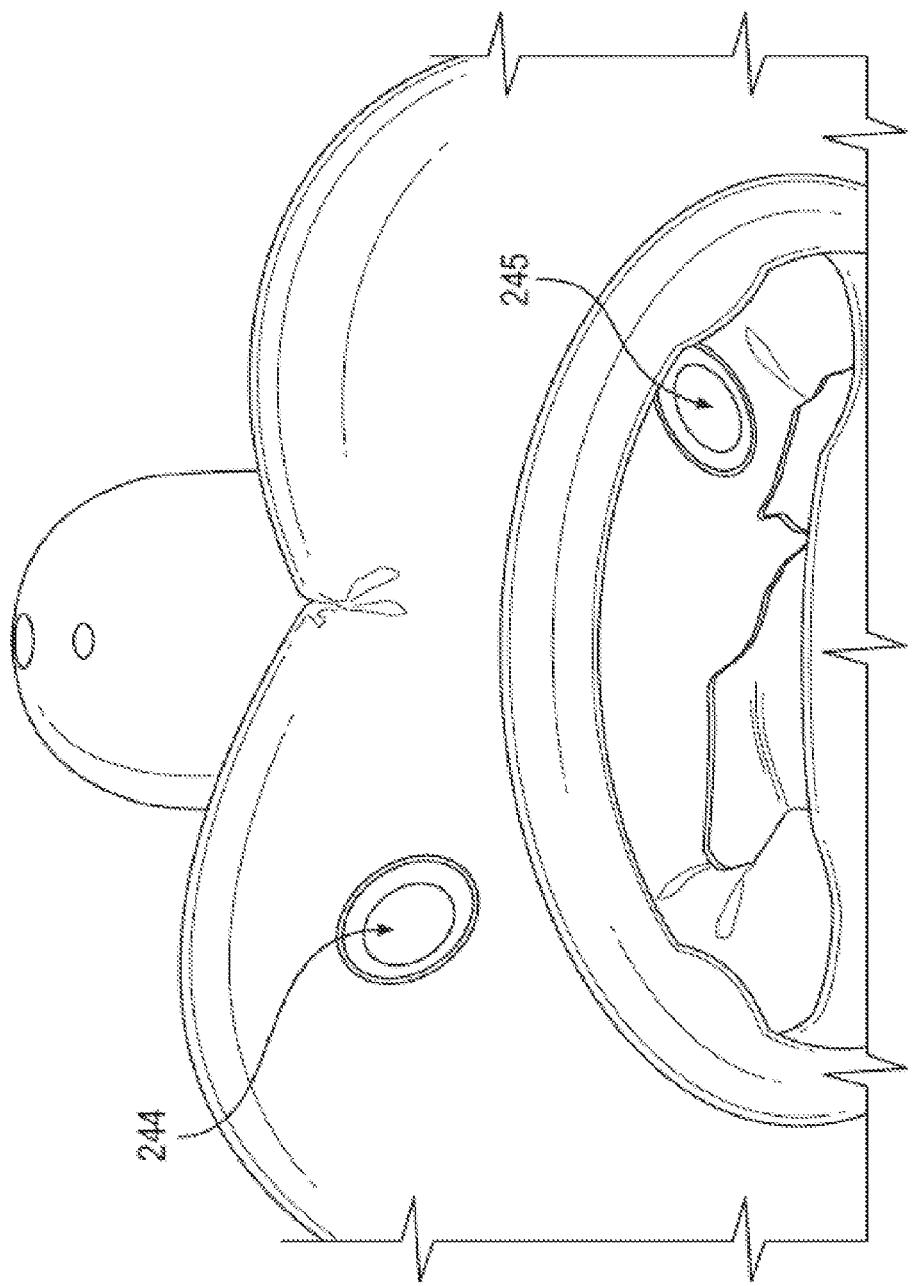

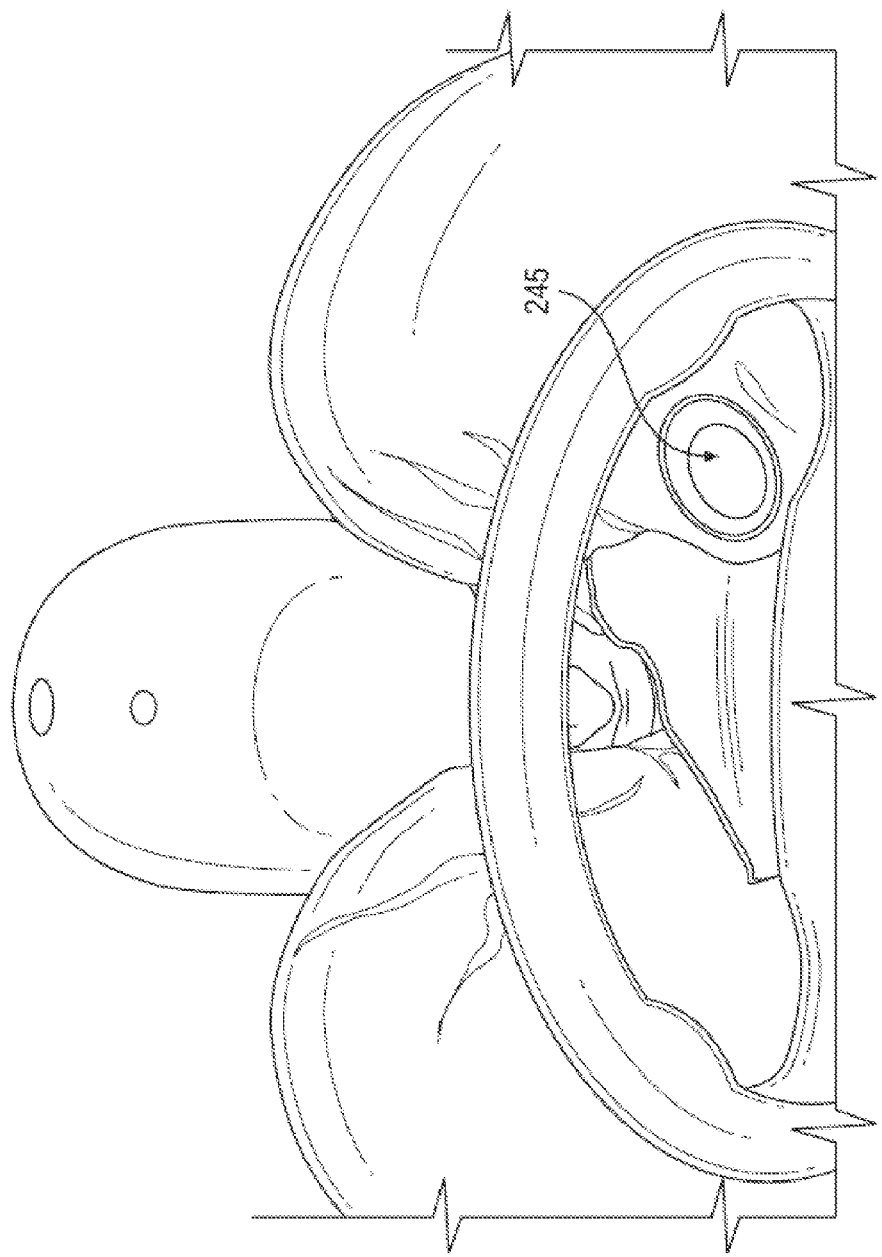

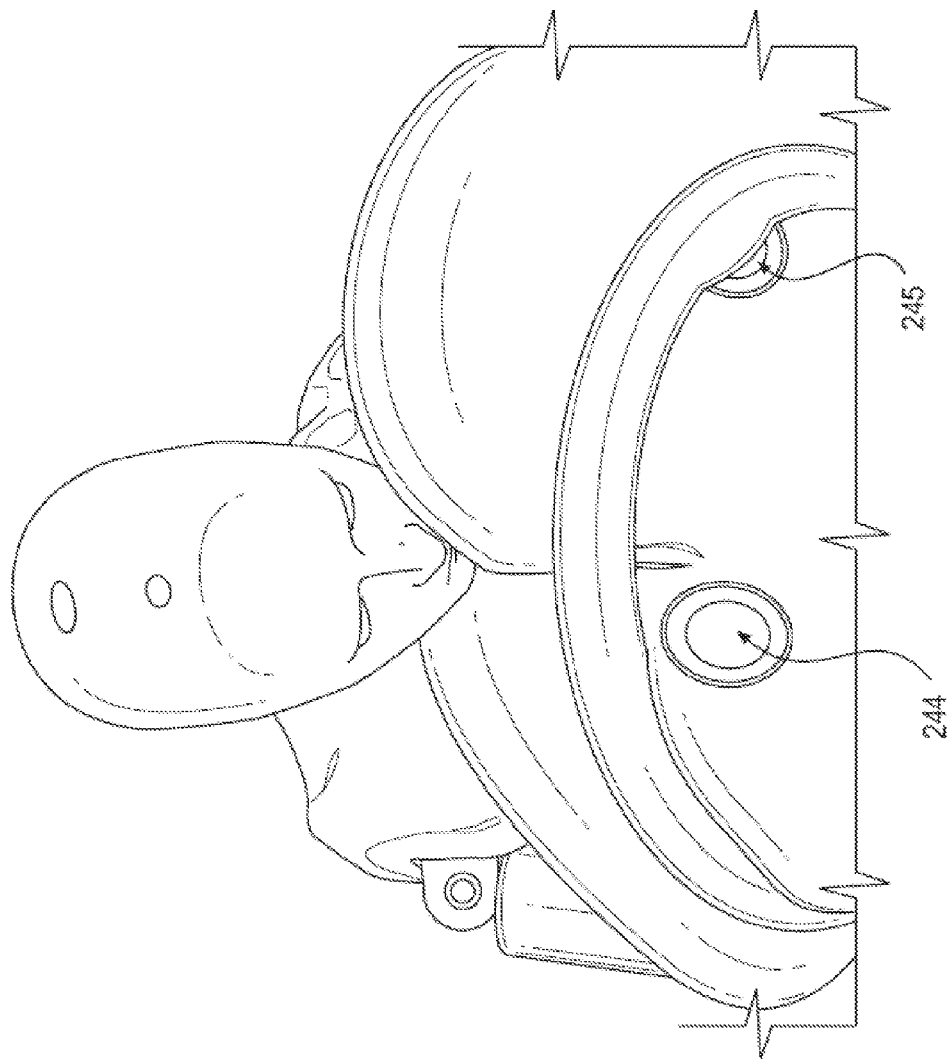

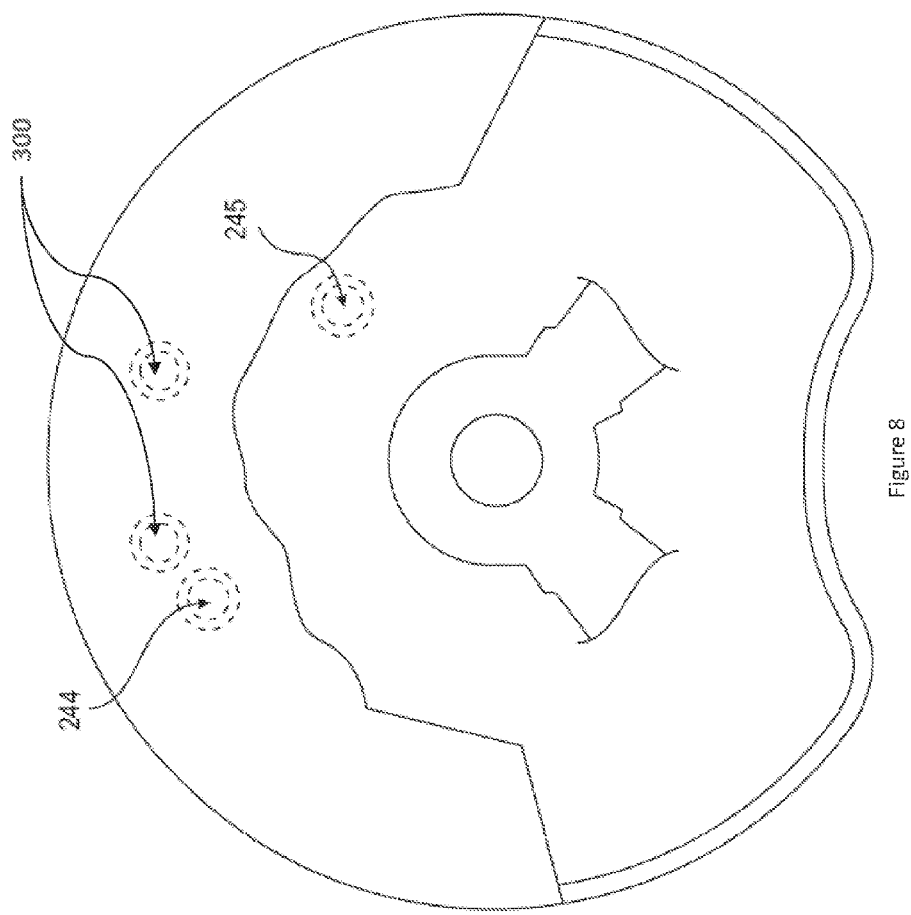

AIRBAG MODULE

CROSS-REFERENCE TO RELATED PATENT APPLICATIONS

This application claims the benefit of and priority to U.S. Provisional Patent Application No. 61/793,178 filed on Mar. 15, 2013, the disclosure of which is incorporated herein by reference in its entirety.

BACKGROUND

The present invention relates generally to a driver side airbag module for a vehicle. The module includes an inflator, housing and inflatable airbag. The module is preferably mounted in a steering wheel of a vehicle. In the event that a condition indicating a vehicle collision is sensed, the inflator is activated causing the airbag to inflate between the driver and the steering wheel. The airbag includes a vent to allow the pressure of the inflation gas to be relieved when the driver impacts the airbag.

SUMMARY

According to one embodiment, an airbag module comprising an airbag configured to inflate between a steering wheel and a vehicle occupant and an inflator configured to provide inflation gas to the airbag is provided. The airbag includes a first vent opening and a second vent opening, and the first and second vent openings are configured to allow venting of an inflation gas. The first vent opening and second vent opening are arranged such that the first vent opening is located above a rim of the steering wheel and the second vent opening is located below the rim of the steering wheel when the airbag is in an inflated state.

According to another embodiment, an airbag module comprising an airbag and an inflator configured to provide inflation gas to the airbag, is provided. The airbag includes a first vent opening and a second vent opening, and the first and second vent openings are configured to allow venting of an inflation gas. The first vent opening is located such that a distance from the first vent opening to a perimeter of the airbag is less than a distance from the second vent opening to the perimeter of the airbag, and the first and second vent openings are non-symmetrically offset from a center vertical axis of the airbag when the airbag is in an inflated state.

The airbag may further comprise an inflator opening configured to allow the inflator to be positioned inside the airbag.

The airbag may further comprise a first panel and a second panel. The first and second vent openings may be provided in the first panel. The first panel may contact the steering wheel when the airbag is in an inflated state. The first panel and the second panel may be connected to each other at least at a portion of a perimeter of the first and second panel.

At least one of the first vent opening and the second vent opening may configured to include passive or active venting control.

The airbag module may further comprise a housing.

The first vent opening and the second vent opening may not be located along a common vertical axis when the airbag is in an inflated state. The airbag may further comprise an inflator opening, and the first vent opening, the second vent opening and the inflator opening may not share a common axis. The first vent opening and the second vent opening may not be located along a common horizontal plane when the airbag is in an inflated state. The airbag may further comprise an inflator opening, and the inflator opening may not share a common vertical or horizontal axis with the first vent opening or the second vent opening.

The airbag module may be configured to be mounted in a steering wheel.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 4 is a top plan view of a panel forming a first panel of a driver side airbag.

FIG. 5 is front view of a crash dummy adjacent to a deployed airbag and steering wheel in which both vent openings of the airbag are unblocked.

FIG. 6 is a front view of a crash dummy adjacent to a deployed airbag and steering wheel in which the first vent opening of the airbag is blocked and the second vent opening of the airbag is unblocked.

FIG. 7 is a front view of a crash dummy adjacent to a deployed airbag and steering wheel in which the second vent opening of the airbag is blocked and the first vent opening of the airbag is unblocked.

FIG. 8 is top plan view and assembly drawing of a first panel for a driver side airbag.

DETAILED DESCRIPTION

Airbag systems or modules are well known for providing improved occupant protection during a dynamic vehicle event, such as a frontal or side impact. Airbag modules provide improved occupant protection or safety, during a dynamic vehicle event, by including an inflatable airbag cushion or airbag that deploys and inflates from gas rapidly pushed into the airbag cushion by means of an inflator, whereby the cushion deploys between the occupant being protected and another portion of the vehicle, such as the dashboard or steering wheel.

The airbag cushion may reduce displacement and acceleration of the occupant reducing the forces and absorbing energy upon impact by the occupant. An inflator or module may use a device, such as a pyrotechnic device or other airbag inflation device, to generate gas almost instantaneously and to push the gas at a high volumetric flow rate into the inflatable airbag cushion of the airbag system. Airbags may be used to provide protection to any occupant located in any seating row (e.g., first, second, third) of a vehicle.

Airbag modules and airbag cushions may be stored within and deployed from any vehicle component, such as the dashboard or steering wheel. Airbags are typically packaged through a process of folding and rolling to compact the airbag in order for it to fit into the small cross-section of the storage area.

Figure 1:
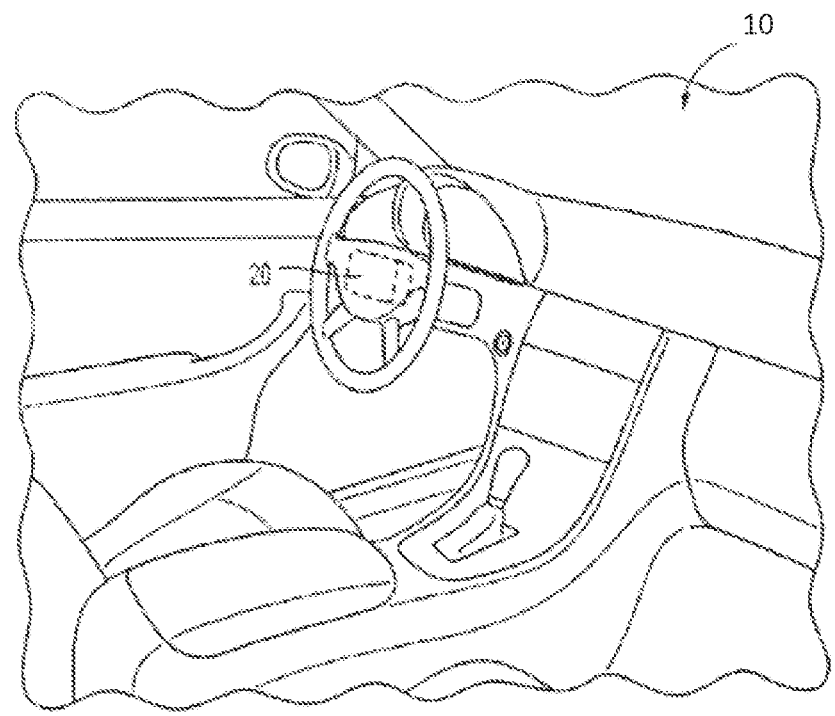
FIG. 1 is an interior view of a vehicle showing a steering wheel and driver side airbag module.
Figure 2:
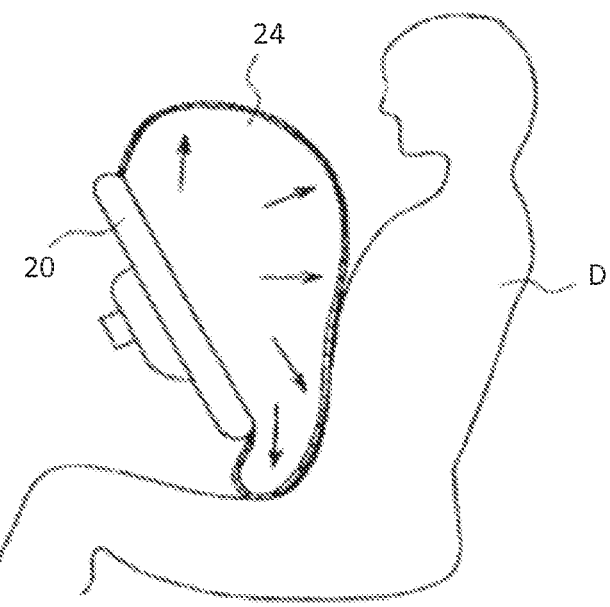
FIG. 2 is a side view of a driver of the vehicle showing an airbag deployed between the driver and the steering wheel.

As shown in FIG. 1 the airbag module may be mounted in the steering wheel 20 of the vehicle 10. As shown in FIG. 2, the airbag 24 may inflate to a position between the steering wheel 20 and the driver D to prevent contact between the driver D and the steering wheel 20 or reduce the acceleration and displacement of the driver D during a dynamic event.

Figure 3:
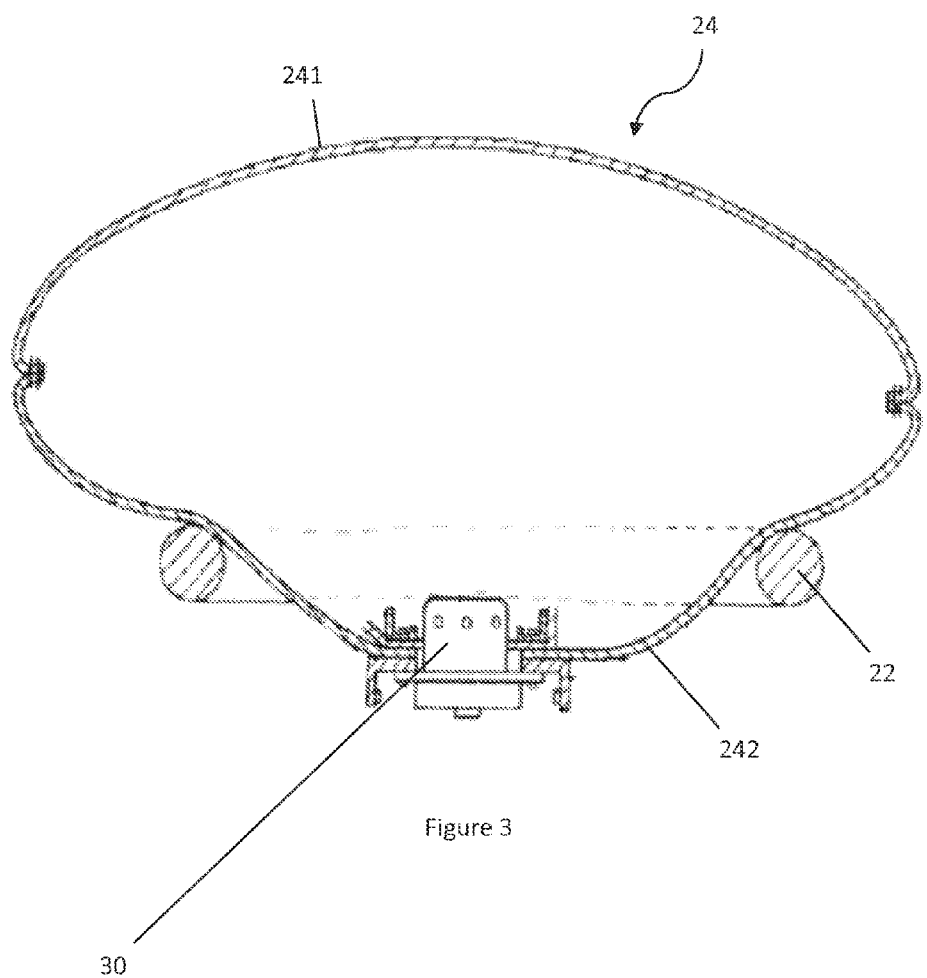
FIG. 3 is a partial cross-sectional view of a driver side airbag module showing the airbag, inflator and steering wheel.

As shown in FIG. 3, the module includes an inflator 30 for supplying inflator gas to the airbag 24. The airbag 24 may be formed from inner and outer panels 241, 242 that are connected at their perimeters. The outer panel 242 may alternatively be considered a first panel and the inner panel 241 may be considered a second panel. After inflation the first panel of the airbag 242 may contact the steering wheel rim 22.

The connection of the first and second panels may be achieved by any appropriate connection structure. According to one embodiment, the first and second panels may be sewn together along at least a portion of their respective perimeters.

As shown in FIG. 4, the first panel of the airbag 242 may include several openings. A generally centrally located inflator opening 243 may be provided in the first panel 242 for positioning of the inflator 30 inside the airbag. A first vent opening 244 and a second vent opening 245 are provided in the first panel 242 to allow for the venting of inflation gas. These vent openings may be configured to be permanently unblocked or open or may be provided with additional active or passive venting control such as, for example, described in U.S. Patent Publication No. 2012-0306187 and U.S. Pat. No. 8,152,199. The foregoing patent publication and patent are incorporated by reference herein in their entirety. The inflator opening 243 may be located such that the inflator opening does not share a common vertical or horizontal axis with the first vent opening or the second vent opening. As shown in FIG. 4, the inflator opening 243, first vent opening 244 and second vent opening 245 may be located such that the openings do not share a common axis. The second vent opening 245 may be located such that a distance from the second vent opening 245 to the inflator opening 243 is less than a distance from the inflator opening 243 to the first vent opening 244.

As disclosed in FIG. 4, the first vent opening 244 and the second vent opening 245 of the airbag module are located in the first panel 242 at non-symmetric offset locations. The first vent opening 244 and the second vent opening 245 may be non-symmetrically offset from a center vertical axis of the airbag 24 when the airbag is in an inflated state. The center vertical axis of the airbag 24 may be the center vertical axis of the first panel 242 of the airbag. The first vent opening 244 and the second vent opening 245 may be located such that the openings do not share a common horizontal plane. The first vent opening 244 and the second vent opening 245 may be located such that the openings do not share a common vertical axis.

According to one embodiment, the center of the first vent opening 244 may be located at a vertical distance of about 249 mm and a horizontal distance of about 108 mm from the center of the inflator opening 243. The center of the second vent opening 245 may be located at a vertical distance of about 106.5 mm and a horizontal distance of about 108 mm from the center of the inflator opening 243. The horizontal distance between the center of the first vent opening 244 and the center of the second vent opening 245 may be about 216 mm.

The non-symmetric offset arrangement of the first and second vent openings provides for an improved driver airbag design for overall improved driver protection including when the driver is out of position (OOP). The non-symmetric offset arrangement may locate the first and second vent openings offset relative to a steering wheel rim when the airbag is in an inflated state. As shown in FIG. 5, the first vent opening 244 may be above the steering wheel rim 22 and the second vent opening 245 may be below the steering wheel rim 22 when the airbag is in an inflated state. A vent opening may be considered to be "above" the steering wheel rim 22 when it is located outside of the perimeter of the steering wheel rim. Similarly, a vent opening may be considered to be "below" the steering wheel rim 22 when it is located within the perimeter of the steering wheel rim, as shown in FIG. 5.

The non-symmetric offset arrangement of the first and second vent openings allows for continuous bag deflation for improved occupant protection during various situation where an occupant is out of position (OOP). A number of OOP occupant scenarios are specified by the NHTSA for which testing must be conducted and passed prior to approval of the airbag for use. The offset venting arrangement provides for improved OOP occupant protection while, at the same time, not sacrificing or reducing the protection provided to a normally seated occupant during full crash conditions. For example as shown in FIG. 5, both the first vent opening 244 and the second vent opening 245 are exposed and unblocked when the airbag is inflated normally.

Many current driver airbags include non-adaptive active vent control. Conventionally, two vent openings are provided. The vent openings are conventionally located symmetrically with both vents either above the steering wheel rim or below the rim, exclusively. In occupant OOP situations, the occupant may interfere with the inflation of the airbag, resulting in the blockage of both vent openings of conventional airbags. The blockage of both vent openings reduces the effectiveness of the airbag in protecting the occupant. The venting of inflation gas provides for a gradual acceleration of an occupant that contacts the airbag as a result of a dynamic event by allowing the pressure of gas within the airbag to be reduced as the occupant impinges on the inflated airbag. The gradual acceleration of the occupant facilitated by the venting of inflation gas increases the effectiveness of the airbag in preventing occupant injury. By contrast, when the conventional vent openings are blocked venting of inflation gas is prevented or reduced and an occupant is placed at increased risk of injury.

A non-symmetric offset arrangement of the vent openings reduces the likelihood that both vent openings will be blocked in occupant OOP situations. Under a first scenario as shown in FIG. 6, an OOP occupant may block the first vent opening. Due to the non-symmetric offset arrangement of the first and second vent openings, the second vent opening 245 is open and not blocked by the OOP occupant. The unblocked second vent opening provides for venting of the airbag and good performance and protection to the occupant even in the OOP occupant scenario.

Under a second scenario as shown in FIG. 7, the airbag may deploy to a position between the steering wheel rim and top of the driver airbag cover due to interference from an OOP occupant, thereby blocking the second vent opening 245. Due to the non-symmetric offset arrangement of the first and second vent openings, the first vent opening 244 is unblocked and open. The unblocked first vent opening 244 provides for venting of inflation gas from the airbag and good performance and protection to the occupant even though the airbag is deployed to a position between the steering wheel rim and the top of the driver airbag cover.

Thus, even in the aforementioned OOP occupant scenarios non-symmetric offset vent opening locations provide for inflation gas venting from the airbag and good occupant protection. The aforementioned OOP occupant scenarios correspond to tests normally performed to meet NHTSA standards for OOP occupant conditions 1 and 2.

The conventional vent hole locations 300 are depicted in FIG. 8 for purposes of comparison to the locations of the first vent opening 244 and the second vent opening 245 in a non-symmetric offset arrangement. Also, as shown in FIG. 8, the airbag may include internal tethers that restrain the deployment of the airbag and the outer panel.

As shown in the drawings and described above, an airbag module comprises an inflator and an airbag stored in a housing. The airbag includes a first panel 242 and a second panel 241 joined together. The first panel 242 includes two vent openings. The first vent opening 244 may be located such that a distance from the first vent opening 245 to a perimeter of the airbag 24 is less than a distance from the second vent opening 244 to the perimeter of the airbag 24.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any precise numerical ranges provided. Accordingly, these terms should be interpreted as indicating that insubstantial or inconsequential modifications or alterations of the subject matter described and claimed are considered to be within the scope of the invention as recited in the appended claims.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

References herein to the positions of elements (e.g., "top," "bottom," "above," "below," etc.) are merely used to describe the orientation of various elements in the FIGURES. It should be noted that the orientation of various elements may differ according to other exemplary embodiments, and that such variations are intended to be encompassed by the present disclosure.

It is important note that the construction and arrangement of the airbag modules as shown in the various exemplary embodiments is illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. Other substitutions, modifications, changes and omissions may also be made in the design, operating conditions and arrangement of the various exemplary embodiments without departing from the scope of the present invention.

What is claimed:

1. An airbag module, comprising:
an airbag configured to inflate between a steering wheel and a vehicle occupant; and
an inflator configured to provide inflation gas to the airbag;
wherein the airbag includes a first vent opening and a second vent opening, the first and second vent openings are configured to allow venting of inflation gas, the first vent opening and second vent opening are arranged such that the first vent opening is located above a rim of the steering wheel and the second vent opening is located below the rim of the steering wheel when the airbag is in an inflated state, the airbag includes an inflator opening, the inflator opening does not share a common vertical axis with the first vent opening, the inflator opening does not share a common vertical axis with the second vent opening, the inflator opening does not share a common horizontal axis with the first vent opening, and the inflator opening does not share a common horizontal axis with the second vent opening.

2. The airbag module of claim 1, wherein the inflator opening is configured to allow the inflator to be positioned inside the airbag.

3. The airbag module of claim 1, wherein the airbag further comprises a first panel and a second panel, and the first and second vent openings are provided in the first panel.

4. The airbag module of claim 3, wherein the first panel contacts the steering wheel when in an inflated state.

5. The airbag module of claim 3, wherein the first panel and the second panel are connected to each other at least at a portion of a perimeter of the first and second panel.

6. The airbag module of claim 1, wherein the at least one of the first vent opening and second vent opening are configured to include passive or active venting control.

7. The airbag module of claim 1, further comprising a housing.

8. The airbag module of claim 1, wherein the first vent opening and second vent opening are not located along a common vertical axis when the airbag is in an inflated state.

9. The airbag module of claim 1, wherein the first vent opening, second vent opening and inflator opening do not share a common axis.

10. The airbag module of claim 1, wherein the airbag module is configured to be mounted in the steering wheel.

11. The airbag module of claim 1, wherein the first vent opening and the second vent opening have substantially the same diameter.

12. An airbag module, comprising:
an airbag; and
an inflator configured to provide inflation gas to the airbag;
wherein the airbag includes a first vent opening and a second vent opening, the vent openings are configured to allow venting of inflation gas, the first vent opening is located such that a distance from the first vent opening to a perimeter of the airbag is less than a distance from the second vent opening to the perimeter of the airbag, the first and second vent openings are non-symmetrically offset from a center vertical axis of the airbag when the airbag is in an inflated state, the airbag includes an inflator opening, the inflator opening does not share a common vertical axis with the first vent opening, the inflator opening does not share a common vertical axis with the second vent opening, the inflator opening does not share a common horizontal axis with the first vent opening, the inflator opening does not share a common horizontal axis with the second vent opening, the airbag comprises a first panel and a second panel, the first and second vent openings are provided in the first panel, and the first panel is configured to face a steering wheel when the airbag module is mounted in a steering wheel and inflated.

13. The airbag module of claim 12, wherein the inflator opening is configured to allow the inflator to be positioned inside the airbag.

14. The airbag module of claim 12, wherein the first panel and the second panel are connected to each other at least at a portion of a perimeter of the first and second panel.

15. The airbag module of claim 12, wherein at least one of the first vent opening and the second vent opening are configured to include passive or active venting control.

16. The airbag module of claim 12, further comprising a housing.

17. The airbag module of claim 12, wherein the first vent opening and the second vent opening are not located along a common horizontal plane when the airbag is in an inflated state.

18. The airbag module of claim 12, wherein the airbag is configured to inflate between the steering wheel and a vehicle occupant.

19. The airbag module of claim 12, wherein the airbag module is configured to be mounted in the steering wheel.

20. The airbag module of claim 12, wherein the first vent opening and the second vent opening have substantially the same diameter.

* * * * *